United States Patent
Ono

(10) Patent No.: US 6,884,316 B2
(45) Date of Patent: Apr. 26, 2005

(54) METHOD OF REMOVING WALLPAPER SHEET AND REMOVER SOLUTION THEREOF

(75) Inventor: Ichiro Ono, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/351,991

(22) Filed: Jan. 28, 2003

(65) Prior Publication Data

US 2003/0141015 A1 Jul. 31, 2003

(30) Foreign Application Priority Data

Jan. 29, 2002 (JP) .......................................... 2002-019855

(51) Int. Cl.$^7$ ............................. B05D 1/28; C08L 83/12
(52) U.S. Cl. ........................................ 156/344; 524/588
(58) Field of Search .......................... 156/344; 524/588

(56) References Cited

U.S. PATENT DOCUMENTS

| | | | |
|---|---|---|---|
| 4,803,008 A | | 2/1989 | Ciolino et al. |
| 5,216,033 A | * | 6/1993 | Pereira et al. ............... 514/63 |
| 5,360,489 A | | 11/1994 | Gaul et al. |
| 5,558,806 A | * | 9/1996 | Policello et al. ............ 516/204 |
| 6,706,076 B1 | * | 3/2004 | Deak et al. .................... 8/137 |
| 2003/0017599 A1 | * | 1/2003 | Howe et al. ................. 435/468 |

FOREIGN PATENT DOCUMENTS

WO    WO 02/48306 A2 *  6/2002  ............ C11D/3/37

OTHER PUBLICATIONS

Derwent English Abstract of JP–57168218 Duskin 10–1982.*
Derwent English Abstract of JP–59170160 KANSAI 03–1983.*

* cited by examiner

Primary Examiner—Jeffrey B. Robertson
(74) Attorney, Agent, or Firm—Millen White Zelano & Branigan, P.C.

(57) ABSTRACT

The invention discloses an efficient method for removing a wallpaper sheet by peeling off a wall body surface to which the wallpaper sheet is adhesively bonded as well as a wallpaper remover solution used in the method for wetting the wallpaper sheet to facilitate peeling. The remover solution contains, as the essential ingredients, (A) a silicone-based surface active agent which is an organopolysiloxane modified with polyoxyalkylene or polyhydric alcohol residues and (B) a moisturizing agent which is typically a polyhydric alcohol or a alkoxyalkanol compound each in a specified concentration of 40–80% by weight, the balance being water as the solvent.

14 Claims, No Drawings

METHOD OF REMOVING WALLPAPER SHEET AND REMOVER SOLUTION THEREOF

BACKGROUND OF THE INVENTION

The present invention relates to a novel method for removing a wallpaper sheet adhesively attached to a wall body surface of, e.g., a living house, off the wall body surface as well as to a wallpaper remover solution used in the method.

As is known, wallpaper sheets used on the interior walls of living houses and other buildings can be classified into several different types including those consisting of a single paper sheet, those consisting of a paper sheet as a substrate provided with a coating layer of a vinyl resin and those as a laminate consisting of a paper or resin-film substrate and a laminating film of a vinyl resin. These wallpaper sheets are coated on one surface usually with a pressure-sensitive adhesive to form an adhesive lining layer and press-attached onto the surface of a wall body to be bonded thereto with intervention of a layer of the pressure-sensitive adhesive.

It is sometimes necessary when repairing of the wall or redesigning of the room is desired that the wallpaper sheet bonded firmly to the wall body surface with an adhesive is removed by peeling off the surface presenting a substantial amount of job depending on the properties of the substrate sheet and types of the pressure-sensitive adhesive which can be a starch-based, acrylic resin-based or cellulosic resin-based adhesive either singly or as a blend.

Accordingly, it is a usual practice that peeling of the wallpaper sheet off the wall body surface is carried out after soaking the paper sheet with water because most of the above named pressure-sensitive adhesives absorb water and become softened to decrease the adhesive bonding strength. A problem there is that the permeability of fresh water alone as a wallpaper remover through the wallpaper sheet is not high enough to facilitate peeling of the wallpaper sheet within a short time or the fresh water applied to the wallpaper surface is rapidly lost by dripping or by evaporation before exhibiting an effect as a remover liquid.

Several proposals and attempts have been made heretofore as a countermeasure to this problem including a method in which the remover liquid is an aqueous solution prepared by dissolving a gelation agent or thickening agent in water to increase viscosity or consistency of the water so that the solution can be retained in contact with the wallpaper sheet for an extended length of time without dripping and a method in which water is supplied to the wallpaper sheet in the form of water vapor or steam by using a steaming humidifier. However, the former method is not quite effective when the wallpaper sheet is water-resistant and the latter method cannot be undertaken with high working efficiency due to the use of a heavy humidifier instrument if not to mention an eventual danger of scalding of workers.

As a further countermeasure to the problem, especially, when the wallpaper sheet is water-resistant, several methods are proposed in U.S. Pat. Nos. 4,067,773, 4,092,175 and 4,274,884, U.K. Patent Application No. 2,058,122A, German Patent 1,806,026 and Japanese Patent Kokai No. 6-250729, according to which the surface of a wallpaper sheet is rubbed with a wire brush or scratched with a knife edge to destroy the water-impermeable surface layer of the sheet followed by soaking of the sheet with an aqueous remover solution prepared by dissolving a surface active agent, an enzyme, a gelation agent, a thickening agent, a water-miscible organic solvent or other additives in water. Although these methods are not ineffective for the purpose of facilitating removal of a wallpaper sheet from a wall body surface by peeling, the effectiveness is quite insufficient in some cases depending on the types of the wallpaper sheets and the nature of the pressure-sensitive adhesives so that it is eagerly desired to develop a novel and more effective water-base remover solution for wallpaper sheets or a more efficient method of removing a wallpaper sheet from a wall body surface.

SUMMARY OF THE INVENTION

The present invention accordingly has an object, in view of the above described problems in the methods for removing a wallpaper sheet from a wall body surface, to provide a novel and efficient method for removing an adhesive-bonded wallpaper sheet from a wall body surface as well as to provide a novel aqueous remover solution used in the method.

Thus, the aqueous remover solution for removal of a wallpaper sheet adhesively bonded to the surface of a wall body with intervention of a layer of a pressure-sensitive adhesive is a uniform aqueous solution comprising:

(A) from 0.01% to 10% by weight of a silicone-based surface active agent; and
(B) from 0.1% to 30% by weight of a moisturizing agent, the balance to 100% by weight being (C) water.

In particular, the aforementioned silicone-based surface active agent is an organopolysiloxane compound modified with or having polyoxyalkylene residues as the pendant groups on the silicon atoms and the content of the polyoxyethylene moiety therein is preferably in the range from 40 to 80% by weight. Alternatively, the silicone-based surface active agent is an organopolysiloxane compound modified with or having polyhydric alcohol residues as the pendant groups on the silicon atoms and the content of the polyhydric alcohol moiety therein is preferably in the range from 40 to 80% by weight, the polyhydric alcohol being typically glycerin. The aforementioned moisturizing agent is a hydroxyl-containing organic compound selected from the group consisting of polyhydric alcohols, monoalkyl ethers of a glycol compound as well as acetate esters thereof and alkoxyalkanols.

The present invention also provides a method for removing a wallpaper sheet from a wall body surface, to which the wallpaper sheet is adhesively bonded with intervention of a layer of a pressure-sensitive adhesive, which method comprises the steps of;

(a) applying, to the surface of the wallpaper sheet, optionally, after rubbing with a wire brush or scratching with a knife edge, the aqueous remover solution defined above:
(b) soaking the layer of the pressure-sensitive adhesive with the aqueous remover solution; and
(c) peeling the wallpaper sheet off the wall body surface.

DETAILED DESCRIPTION OF THE PREFERRED EMBODIMENTS

As is summarized above, the remover solution provided by the present invention is an aqueous solution comprising, as the essential ingredients, (A) a silicone-based surface active agent, (B) a moisturizing agent and (C) water as a solvent for the components (A) and (B) each in a specified proportion. The method of the present invention for removal of a wallpaper sheet from a wall body surface is characterized by the use of this unique remover solution defined above for soaking of the wallpaper sheet or the layer of a pressure-sensitive adhesive thereby to facilitate peeling of the wallpaper sheet off the wall body surface.

The silicone-based surface active agent as the component (A) in the inventive remover solution is an ingredient exhibiting an effect of decreasing the surface tension of water so as to increase penetrability of the aqueous solution through the wallpaper sheet. The component (A) can be selected without particular limitations from the classes of silicone-based anionic, non-ionic, cationic and amphoteric surface active agents.

The aforementioned silicone-based anionic surface active agent includes silicones modified with a carboxylate salt, silicones modified with a sulfonate salt, silicones modified with a sulfate ester salt and silicones modified with a phosphate ester salt. The aforementioned silicone-based non-ionic surface active agent includes silicones modified with a polyoxyalkylene and silicones modified with a polyhydric alcohol. The aforementioned silicone-based cationic surface active agent includes silicones modified with a quaternary ammonium salt. The aforementioned silicone-based amphoteric surface active agent includes silicones modified with betaine. Among these four classes of silicone-based surface active agents, the non-ionic surface active agents such as silicones modified with a polyoxyalkylene, referred to as POA hereinafter, and silicones modified with a polyhydric alcohol, refered to as PHA hereinafter, are preferred as the component (A) in the inventive remover solution in respects of good availability at low costs and high safety against human body in addition to the high efficiency for decreasing the surface tension of an aqueous solution as a matter of course as compared with the surface active agents of the other classes.

The above-mentioned POA-modified silicone as the component (A) in the inventive wallpaper remover solution is an organopolysiloxane compound having POA residues in the molecular structure as pendant groups to the silicon atoms. Such a modified organopolysiloxane compound is represented by the average unit formula $$R^1_p R^2_q SiO_{(4-p-q)/2},\quad (I)$$

In which $R^1$ is a monovalent hydrocarbon group free from aliphatic unsaturation and having 1 to 10 carbon atoms, $R^2$ is a POA residue expressed by the general formula —$C_f H_{2f} O(C_g H_{2g} O)_h R^3$, $R^3$ being a hydrogen atom, an acyl group or a monovalent hydrocarbon group having 1 to 4 carbon atoms free from aliphatic unsaturation, the subscript f being an integer of 2 to 6, the subscript g being 2, 3 or 4 and the subscript h being a positive integer not exceeding 200, the subscript p is 0 or a positive number not exceeding 3 and the subscript q is a positive number smaller than 3 with the proviso that p+q does not exceed 3.

The aforementioned monovalent hydrocarbon group denoted by $R^1$ is exemplified by alkyl groups such as methyl, ethyl, propyl, butyl, pentyl, hexyl, heptyl, octyl, nonyl and decyl groups, cycloalkyl groups such as cyclopentyl and cyclohexyl groups, aryl groups such as phenyl and tolyl groups and aralkyl groups such as benzyl and phenethyl groups. These hydrocarbon groups can optionally be substituted by halogen, e.g., fluorine, atoms for a part or all of the hydrogen atoms therein as in trifluoropropyl and heptadecafluorodecyl groups. The group denoted by $R^3$ in the POA residue can be a methyl, ethyl, propyl or butyl group if it is not a hydrogen atom nor an acyl group.

The POA-modified silicone compound as the component (A) in the inventive remover solution should contain the POA moiety in a content in the range from 40% to 80% by weight or, preferably, from 45% to 70% by weight. When the content of the POA moiety is too low, the silicone compound suffers a decrease in the solubility in water so that subsequent phase separation may eventually take place in the solution if once a uniform solution could be prepared. When the content of the POA moiety is too high, on the other hand, no sufficient surface activity can be exhibited in the solution resulting in a decrease in the penetrability of the remover solution through the wallpaper sheet.

The PHA-modified silicone as the other class of the silicone-based non-ionic surface active agents as the component (A) in the inventive remover solution is an organopolysiloxane compound having, in the molecular structure, residues derived from a PHA such as glycerin, saccharide compounds and the like, of which residues derived from glycerin are preferable though not limited thereto.

The glycerin-modified organopolysiloxane compound as the component (A) is represented by the average unit formula $$R^1_p R^4_q SiO_{(4-p-q/2)},\quad (II)$$

in which $R^1$ and the subscripts p and q are each defined in the same way as for the average unit formula (I), though independently therefrom, and $R^4$ is a pendant group to the silicon atom expressed by the general formula —$R^5$—O—$R^6$, $R^5$ being a divalent hydrocarbon group having 2 to 20 carbon atoms, optionally, interrupted by one or more of ether linkages —C—O—C— or ester linkages —CO—O— and $R^6$ being a monovalent group or residue derived from a polyhydric alcohol having at least two hydroxyl groups.

The optionally interrupted, divalent hydrocarbon group denoted by $R^5$ is exemplified by the groups of the formulas —(CH$_2$)$_2$—, —(CH$_2$)$_3$—, —CH$_2$CH(CH$_3$)—CH$_2$—, —(CH$_2$)$_4$—, —(CH$_2$)$_5$—, —(CH$_2$)$_6$—, —(CH$_2$)$_7$—, —(CH$_2$)$_8$—, —(CH$_2$)$_2$—CH(CH$_2$CH$_2$CH$_3$)—, —CH$_2$—CH(CH$_2$CH$_3$)—, —(CH$_2$)$_3$—O—(CH$_2$)$_2$—, —(CH$_2$)$_3$—O—(CH$_2$)$_2$—O—(CH$_2$)$_2$—, —(CH$_2$)$_3$—O—CH$_2$CH(CH$_3$)—, —CH$_2$—CH(CH$_3$)—CO—O—(CH$_2$)$_2$— and the like, though not particularly limited thereto.

The PHA residue denoted by $R^6$ is exemplified by the groups expressed by the following formulas including:

(III)

(IV)

and

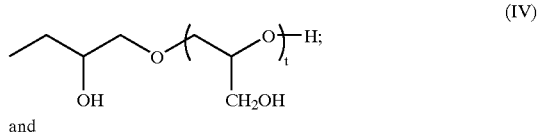
(V)

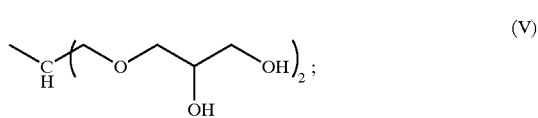

in which the subscripts s and t are each a positive integer not exceeding 20. It is optional that one or more of the hydroxyl groups in these PHA residues are substituted for the hydrogen atoms thereof by alkoxy or acyl groups.

The various types of the silicone-based surface active agents described above as the component (A) in the inventive wallpaper remover solution can be used either singly or as a combination of two kinds or more according to need, if they are compatible each with the others.

The component (B) formulated in the inventive aqueous remover solution is a moisturizing agent which serves to absorb or retain water and is selected from water-soluble organic compounds having a relatively high boiling point. Examples of such an organic compound include polyhydric alcohols as well as ethers and esters thereof such as glycerin, ethyleneglycol, diethyleneglycol, triethyleneglycol, polyethyleneglycol, propyleneglycol, dipropyleneglycol and tripropyleneglycol, glycol ethers such as methyl, ethyl, propyl and butyl ethers of ethyleneglycol, diethyleneglycol or propyleneglycol, alkoxyalkanols such as 3-methoxybutyl alcohol and 3-methoxy-3-methylbutyl alcohol and monoether monoacetates of a glycol compound such as ethyleneglycol monomethyl ether acetate, and propyleneglycol monoethyl ether acetate and the like, though not limited thereto, of which those having a boiling point higher than 100° C. are preferred. These moisturizing agents can be used in the inventive remover solution either singly or as a combination of two kinds or more according to need.

The wallpaper remover solution of the present invention is formulated with the above described components (A) and (B) as the essential ingredients as dissolved in water as the solvent therefor. The contents of the components (A), i.e. silicone-based surface active agent, and the component (B), i.e. moisturizing agent, in the remover solution should be in the ranges from 0.01% to 10% by weight and from 0.1% to 30% by weight, respectively, or, preferably, in the ranges from 0.1% to 5% by weight and from 0.5% to 10% by weight, respectively, the balance to 100% by weight being water. When the content of the component (A) is too low, no sufficient surface activity can be exhibited in the remover solution resulting in a decrease in the penetrability of the solution through the wallpaper sheet while no additional improvement can be obtained by excessively increasing the content thereof rather with an economical disadvantage due to expensiveness of the compound. When the content of the component (B) is too low, no sufficient water retention can be accomplished in the wallpaper sheet wetted with the remover solution resulting in too early drying of the sheet soaked with the remover solution while, when the content thereof is too high, the solution is imparted with an increased surface tension resulting in a decrease in the penetrability of the solution.

It is of course optional according to need that the above described wallpaper remover solution of the present invention is further admixed with a variety of known additives including thickening agents, gelation agents, water-miscible organic solvents, enzymes, preservatives, perfumes, coloring agents and others each in a limited amount.

In conducting the inventive method for removal of a wallpaper sheet from a wall body surface with the aid of the above described remover solution, the wallpaper sheet on the wall is first wetted with the remover solution by a conventional method such as spraying, brushing and roller coating. When the wallpaper sheet has a sheet structure consisting of a single paper sheet only without any surface finishing for water resistance, it is usually sufficient to just apply the remover solution to the surface. When the wallpaper sheet has a surface finishing layer for water resistance on a paper substrate, a pretreatment for destroying the surface finishing layer is preferably undertaken by rubbing the surface with a wire brush or by scratching the surface with a knife edge. Provided that this pretreatment is properly undertaken, the remover solution rapidly penetrates through the wallpaper sheet to reach the layer of the pressure-sensitive adhesive so that the pressure-sensitive adhesive is soaked with the remover solution and the adhesive bonding strength between the wallpaper sheet and the wall body surface is decreased to facilitate peeling of the wallpaper sheet off the wall body surface. It is usually sufficient that the wallpaper sheet wetted with the remover solution is kept standing on the wall for 1 to 5 hours or, preferably, 3 to 60 minutes before peeling off the wall body surface.

In the following, a more detailed description is given of the wallpaper remover solution and the method of removing a wallpaper sheet from a wall body surface according to the present invention by way of Examples and a Comparative Example although the scope of the invention is never limited thereby in any way. In the following description, the term of "parts" always refers to "parts by weight".

EXAMPLE 1

An aqueous wallpaper remover solution, referred to as the Solution I hereinafter, having a surface tension of 19.9 dyn/cm (19.9 mN/m) at 25° C. as measured with a type CBVD surface tension meter (Model A3, manufactured by Kyowa Surface Chemical Co.) was prepared by dissolving, in 96.5 parts of water, 3.0 parts of diethyleneglycol and 0.5 part of a polyoxyethylene-modified silicone-based surface active agent, referred to as the Surfactant I hereinafter, expressed by the formula $Me_3Si$—O—$SiMeG^1$—O—$SiMe_3$, in which Me is a methyl group and the group denoted by $G^1$ is a polyoxyethylene residue of the formula —$C_3H_6O(C_2H_4O)_8Me$, of which the content of the polyoxyethylene moiety was 54% by weight.

A wallpaper removing test was conducted with the thus prepared Solution I in the following manner. The wallpaper subjected to the test was a commercially available laminated wallpaper sheet having a substrate layer of paper laminated with a polyvinyl chloride resin film as a topping. The wallpaper sheet was adhesively bonded onto the surface of a vertical plasterboard wall body by using a starch-based adhesive paste 6 months ago.

As a pretreatment, line incisions running in a horizontal direction were made in the thus bonded wallpaper sheet with a knife edge in an incision depth to reach the substrate paper layer and the wallpaper sheet having the incision lines was fully wetted over the whole surface with the Solution I by brushing. After standing the thus wetted wallpaper sheet as such for 5 minutes, the wallpaper sheet was manually peeled off the wall body surface and the condition of the wall body surface after peeling of the sheet was visually examined to find that the surface was in a good condition without any debris of the wallpaper substrate left unpeeled.

EXAMPLE 2

A second wallpaper remover solution having a surface tension of 19.8 dyn/cm (19.8 mN/m) at 25° C., referred to as the Solution II hereinafter, was prepared in the same formulation as for the Solution I in Example 1 excepting for replacement of the diethyleneglycol with the same amount of 3-methyl-3-methocybutyl alcohol. The result of the wallpaper removing test conducted in the same manner as in Example 1 by using the Solution II was as good as in Example 1.

EXAMPLE 3

A third wallpaper remover solution having a surface tension of 18.2 dyn/cm (18.2 mN/m) at 25° C., referred to as the Solution III hereinafter, was prepared in substantially the same manner as for the Solution I in Example 1 excepting for an increase of the amount of the Surfactant I from 0.5 part to 3.0 parts and a decrease of the amount of water from 96.5 parts to 94.0 parts. The result of the wallpaper removing test undertaken in the same manner as in Example 1 by using the Solution III was as good as in Example 1.

EXAMPLE 4

A fourth wallpaper remover solution having a surface tension of 23.7 dyn/cm (23.7 mN/m) at 25° C., referred to as the Solution IV hereinafter, was prepared in substantially the same manner as for the Solution I in Example 1 excepting for the replacement of 0.5 part of the Surfactant I with 2.0 parts of a second polyoxyalkylene-modified organopolysiloxane, referred to as the Surfactant II hereinafter, having 49% by weight content of the polyoxyethylene moiety, which was expressed by the structural formula $Me_3Si-O-(SiMe_2-O)_{30}-(SiMeG^2-O)_5-SiMe_3$, in which Me is a methyl group and $G^2$ is a polyxyalkylene residue of the formula $-C_3H_6O(C_2H_4O)_{26}(C_3H_6O)_9C_4H_9$, and a decrease of the amount of water from 96.5 parts to 95.0 parts. The result of the wallpaper removing test conducted in the same manner as in Example 1 by using the Solution IV was as good as in Example 1.

EXAMPLE 5

A fifth wallpaper remover solution having a surface tension of 21.5 dyn/cm (21.5 mN/m) at 25° C., referred to as the Solution V hereinafter, was prepared in substantially the same manner as for the Solution I in Example 1 excepting for the replacement of 0.5 part of the Surfactant I with the same amount of a glycerin-modified organopolysiloxane, referred to as the Surfactant III hereinafter, having 47% by weight content of the PHA residues, which was expressed by the structural formula $Me_3Si-O-(SiMe_2-O)_{11}-(SiMeG^3-O)_7-SiMe_3$, in which Me is a methyl group and $G^3$ is a glycerin residue expressed by the formula $-C_3H_6OCH[CH_2OCH_2CH(OH)CH_2OH]_2$. The result of the wallpaper removing test conducted in the same manner as in Example 1 by using the Solution V was as good as in Example 1.

Comparative Example

A sixth wallpaper remover solution having a surface tension of 28.5 dyn/cm (28.5 mN/m) at 20° C., referred to as the Solution VI hereinafter, was prepared in substantially same formulation as for the Solution I in Example 1 excepting for the replacement of the Surfactant I with the same amount of a conventional non-silicone surface active agent expressed by the formula $C_{10}H_{21}O(C_2H_4O)_{10}(C_3H_6O)_4H$. The result of the wallpaper removing test conducted in the same manner as in Example 1 with the Solution VI instead of the Solution I was that the surface of the wall body after peeling of the wallpaper sheet was not in a good condition partly with debris of the paper substrate of the sheet left unremoved.

What is claimed is:

1. A uniform wallpaper remover solution comprising:
0.01%–10% by weight of a silicone-based surface active agent; wherein the silicone-based surface active agent is a polyoxyalkylene- or polyhydric alcohol-modified organopolysiloxane compound having, in a molecule, at least one polyoxyalkylene residue or polyhydric alcohol residue as a pendant to the silicon atom in the organopolysiloxane molecule, and the content of the polyoxyethylene residue or polyhydric alcohol residue in the polyoxyalkylene- or polyhydric alcohol-modified organopolysiloxane compound is in the range of 40%–80% by weight; and
from 0.1%–30% by weight of a moisturizing agent, the balance to 100% by weight being water.

2. The wallpaper remover solution as claimed in claim 1, wherein the content of the polyoxyethylene residue or polyhydric alcohol residue in the polyoxyalkylene- or polyhydric alcohol-modified organopolysiloxane compound is in the range of 45%–70% by weight.

3. The uniform wallpaper remover solution as claimed in claim 1, wherein the moisturizing agent is a compound selected from the group consisting of polyhydric alcohols, glycol ethers, alkoxyalkanols and glycol ether acetates.

4. A method for removing a wallpaper sheet adhesively bonded to the surface of a wall body with intervention of an adhesive layer, comprising:
(a) applying, to the surface of the wallpaper sheet, the wallpaper remover solution comprising:
0.01%–10% by weight of a silicone-based surface active agent; and
0.1%–30% by weight of a moisturizing agent,
the balance to 100% by weight being water;
so as to wet the wallpaper sheet therewith;
(b) soaking the adhesive layer with the wallpaper remover solution penetrating the wallpaper sheet so as to soften the adhesive layer; and
(c) peeling the wallpaper sheet off the wall body surface.

5. The method for removing a wallpaper sheet from a wall body surface as claimed in claim 4, wherein the wallpaper sheet wetted with the wallpaper remover solution in (a) is kept standing for 1 minute–5 hours before (c).

6. The method for removing a wallpaper sheet from a wall body surface as claimed in claim 4, wherein the wallpaper sheet is, prior to (a), rubbed with a wire brush or scratched with a knife edge.

7. A uniform wallpaper remover solution, comprising:
0.01%–10% by weight of a silicone-based surface active agent; wherein the silicone-based surface active agent is a polyhydric alcohol-modified organopolysiloxane compound having, in a molecule, at least one glycerin residue as a pendant to the silicon atom in the organopolysiloxane molecule;
0.1%–30% by weight of a moisturizing agent; and
the balance to 100% by weight being water.

8. A uniform wallpaper remover solution, comprising:
0.01%–10% by weight of a silicone-based surface active agent; wherein the silicone based surface active agent is a polyhydric alcohol-modified organopolysiloxane compound having, in a molecule, at least one polyhydric alcohol residue as a pendant to the silicon atom in the organopolysiloxane molecule, wherein the polyhydric alcohol is of the formula:

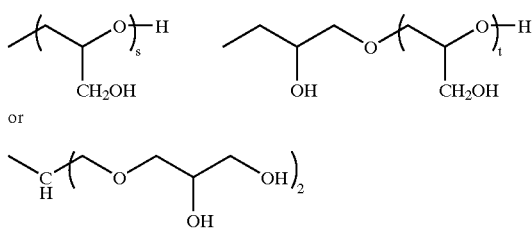

wherein the subscripts s and t are each a positive integer not exceeding 20;
0.1%–30% by weight of a moisturizing agent; and
the balance to 100% by weight being water.

9. The uniform wallpaper remover solution according to claim 1, further comprising a thickening agent, a gelation agent, a water-miscible organic solvent, an enzyme or a perfume.

10. The uniform wallpaper remover solution according to claim 7, further comprising a thickening agent.

11. The uniform wallpaper remover solution according to claim 7, further comprising a gelation agent.

12. The uniform wallpaper remover solution according to claim 7, further comprising a water-miscible organic solvent.

13. The uniform wallpaper remover solution according to claim 7, further comprising an enzyme.

14. The uniform wallpaper remover solution according to claim 7, further comprising a perfume.

* * * * *